(12) United States Patent
Flagle (10) Patent No.: US 7,825,354 B2
(45) Date of Patent: Nov. 2, 2010

(54) PEAK POWER PULSE ENERGIZING CIRCUIT FOR A LIGHT EMITTING DIODE ARRAY

(76) Inventor: Harry D. Flagle, 3947 Eureka Dr., Studio City, CA (US) 91604

( * ) Notice: Subject to any disclaimer, the term of this patent is extended or adjusted under 35 U.S.C. 154(b) by 1260 days.

(21) Appl. No.: 11/385,890

(22) Filed: Mar. 22, 2006

(65) Prior Publication Data

US 2007/0223220 A1    Sep. 27, 2007

(51) Int. Cl.
H05B 1/02    (2006.01)
(52) U.S. Cl. .................. 219/497; 219/494; 219/502; 43/17.6
(58) Field of Classification Search ......... 219/494, 219/497, 501, 505, 506, 492, 493, 502; 43/17.5, 43/17.6
See application file for complete search history.

(56) References Cited

U.S. PATENT DOCUMENTS

| | | | |
|---|---|---|---|
| 3,308,569 A | 3/1967 | Foellner et al. | |
| 3,721,033 A | 3/1973 | Haynes | |
| 4,175,348 A | 11/1979 | Ray | |
| 4,227,331 A | 10/1980 | Ursrey et al. | |
| 4,536,985 A | 8/1985 | Caviness | |
| 4,811,513 A | 3/1989 | Grobl | |
| 5,157,857 A | 10/1992 | Livingston | |
| 5,175,951 A | 1/1993 | Fruchey | |
| 5,392,555 A | 2/1995 | Tingey | |
| 6,098,331 A * | 8/2000 | Kim et al. | 43/4.5 |
| 6,545,428 B2 * | 4/2003 | Davenport et al. | 315/276 |
| 6,807,766 B1 | 10/2004 | Hughes et al. | |
| 6,922,935 B2 | 8/2005 | Yu | |
| 7,107,717 B2 * | 9/2006 | Pelegrin | 43/17.6 |
| 2003/0182841 A1 * | 10/2003 | Calak et al. | 43/17.6 |
| 2005/0168965 A1 * | 8/2005 | Yoshida | 362/3 |

* cited by examiner

*Primary Examiner*—Mark H Paschall
(74) *Attorney, Agent, or Firm*—William L. Gates (57) ABSTRACT

An array of light emitting diodes (LEDs) located in or on an article for attracting attention are energized over respective time increments of a predetermined duty cycle with peak power pulses having an amplitude substantially equal to their rated forward voltage $V_F$ and a current no larger than their rated maximum current $I_{MAX}$.

31 Claims, 10 Drawing Sheets

PEAK POWER PULSE ENERGIZING CIRCUIT FOR A LIGHT EMITTING DIODE ARRAY

BACKGROUND OF THE INVENTION

This invention is directed to circuitry for energizing light emitting devices such as light emitting diodes, and more particularly, to a circuit for energizing an array of light emitting diodes located in an operational environment such as, but not limited to, a fishing lure or other type of device intended to attract attention or please the eye of the viewer.

Light emitting diodes (LEDs) and their associated circuitry for generating a high intensity light output are generally well known. Applications for their use are widespread and include, for example but not limited to, fishing lures, jewelry, various types of novelty devices, traffic signals and outdoor message boards, to name a few. It is a well-known fact that excessive and destructive heat can be generated by the continuous operation of any light emitting diode at high voltages for long periods of time, but can be avoided by operating the LEDs over a relatively short duty cycle. It has been determined through experimentation, however, that not only can life expectancy of LEDs be extended, but also the battery life where applicable, and the brightness, i.e. intensity, of the LEDs maximized by operating the respective LEDs at peak pulse power, i.e., where the LEDs are pulsed one at a time or in groups in a predetermined sequence at substantially maximum peak voltage which is equal to the rated forward voltage ($V_F$) and the rated maximum current ($I_{MAX}$) for equal predetermined portions or time increments of an operational duty cycle.

SUMMARY

Accordingly, it is a primary object of the present invention to provide circuitry for energizing light emitting devices and, more particularly, to energizing a plurality of light emitting diodes (LEDs) which are energized over respective time increments of a predetermined duty cycle with peak power pulses having an amplitude substantially equal to their rated forward voltage $V_F$ and a current no larger than their rated maximum current $I_{MAX}$.

In accordance with one aspect of the invention, there is provided a circuit for energizing light emitting devices, comprising: a plurality of electrically energized light emitting devices; a DC power source; and, one or more circuit components connected to the DC power source, on demand, for generating a pulse of substantially peak power selectively applied, one at a time, or in groups, to said plurality of light emitting devices for emitting relatively bright flashes of light in a random or ordered sequence.

According to another aspect of the invention, there is provided a circuit for energizing a plurality of light emitting devices associated with, but not limited to, a device adapted to float or be submerged in a liquid, comprising: a plurality of electrically energizable light emitting diodes (LEDs) located within or on an outside surface of a device which may be, but not limited to, a fishing lure; a DC power source located in a body portion of the device; and a circuit located in the body portion of the device connected to and energized by the DC power source for generating a substantially peak power pulse applied to each of the light emitting diodes which emit high intensity flashes of light for respective time intervals, i.e., the pulse width of the energizing pulse.

According to yet another aspect of the invention, the device comprises one which operates in a non-liquid environment, such as a toy, a novelty, and a signaling device, to mention but a few.

Further scope of applicability of the present invention will become apparent from the detailed description provided hereinafter. It should be understood, however, that the detailed description and the specific examples, while indicating the preferred embodiments of the invention, they are provided by way of illustration only, since various changes and modifications within the spirit and scope of the invention will become apparent to those skilled in the art.

BRIEF DESCRIPTION OF THE DRAWINGS

The present invention will become more fully understood from the detailed description provided hereinafter in the accompanying drawings which are provided by way of illustration only, and thus are not meant to be considered in a limiting sense, and wherein.

DETAILED DESCRIPTION OF THE PREFERRED EMBODIMENTS

Figure 1:
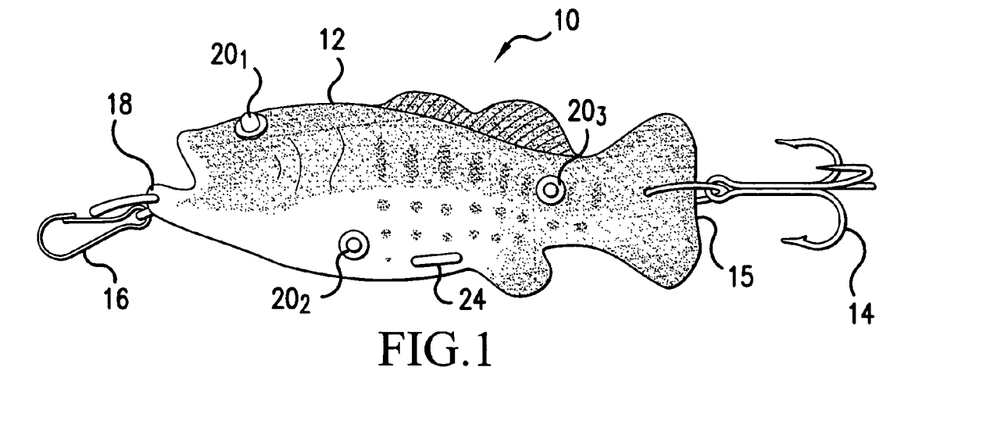
FIG. 1 is a side plan view of a fish lure which comprises a first embodiment of the subject invention.

Referring now to the drawing figures wherein like reference numerals refer to like parts throughout, FIG. 1 is illustrative of a fish lure 10 comprising a first embodiment of the invention and which includes the body portion 12 in the form of a fish having a fisherman's hook 14 secured to the tail portion 15 and a clip 16 secured to the mouth portion 18 for attachment to a fishing line, now shown.

Figure 2A:
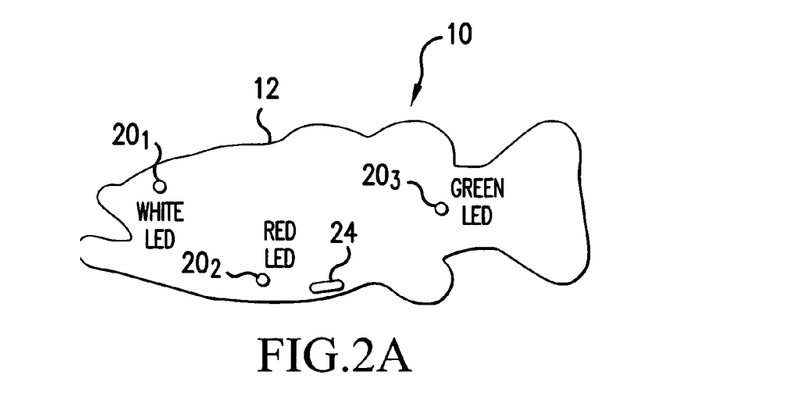
FIG. 2A and FIG. 2B comprise opposite side views of the embodiment shown in FIG. 1 for the arrangement of six light emitting diodes (LEDs) located on the body of the fish lure.
Figure 2B:
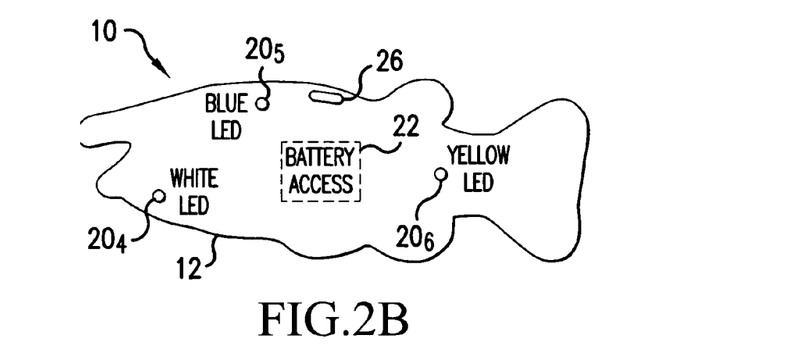

The fish lure 10 includes a plurality of light emitting devices and, more particularly, to six light emitting diodes (LEDs) shown schematically in FIGS. 2A and 2B by reference numerals $20_1$, $20_2$, $20_3$, $20_4$, $20_5$, and $20_6$. The LEDs $20_1 \ldots 20_6$ are designed to emit high intensity light flashes of a certain color of light, for example, red, blue, green, yellow and white as shown in FIGS. 2A and 2B and are selectively energized in a predetermined sequence, but are mutually displaced from one another by a selective arrangement of the LEDs $20_1 \ldots 20_6$, on the surface of the fish body 12 as shown in FIGS. 4, 2A and 2B so as to provide a flashing light display exhibiting a random sequence. As shown in FIG. 2B a battery access opening 22 is provided in the fish body 12 so that a battery (not shown) can be located inside of the fish body 12 for powering the LEDs $20_1 \ldots 20_6$. Also shown in FIGS. 2A and 2B is a pair of fluid sensing probes 24 and 26 which are adapted to turn on an LED energizing circuit 28 shown in FIG. 5, for example, when contact is made with either fresh or salt water.

Figure 3:
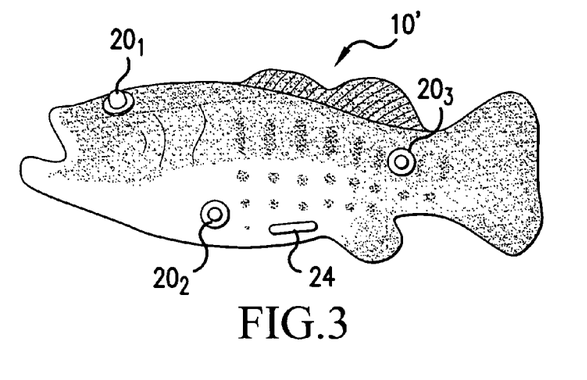
FIG. 3 is a side view of a fish type toy or novelty device in accordance with a second embodiment of the invention.

FIG. 3 is intended to show a modification of the fish lure 10 shown in FIG. 1 so that it can be utilized, for example, as a novelty device such as a bath tub toy 10' and in all respects resembles the fish lure embodiment shown in FIG. 1 including a set of six LEDs $20_1 \ldots 20_6$ except that the hook 14 and clip 16 are now deleted. Otherwise, two embodiments are substantially the same.

Figure 4A:
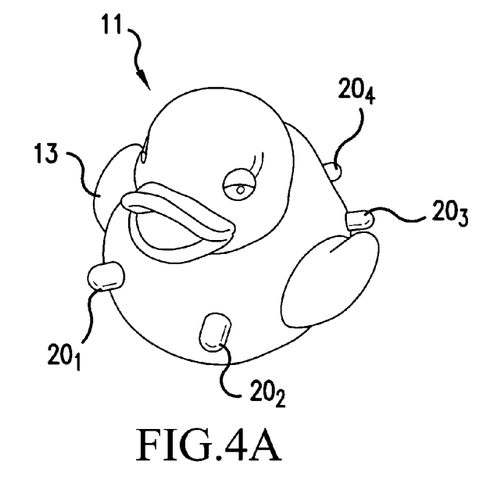
FIGS. 4A, 4B and 4C are illustrative of a duck-type bath toy in accordance with a third embodiment of the subject invention.
Figure 4B:
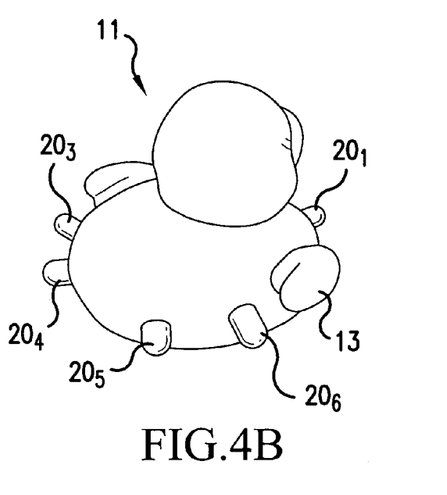
Figure 4C:
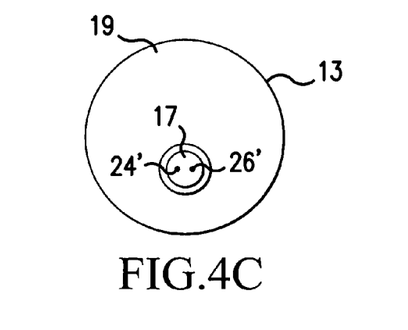

A third embodiment of the invention, also including a set of six LEDs $20_1 \ldots 20_6$ is shown in FIGS. 4A, 4B and 4C. There a toy duck 11, which can be used as a bath toy, is shown including six LEDs $20_1 \ldots 20_6$ mounted around the body portion 13 and which are powered by a battery, not shown, located inside the body portion 13. A small battery access element 17 is shown in FIG. 4C located in the bottom surface 19 of the duck body portion 13 so that one can change the battery when required. Also shown in FIG. 4C is a pair of fluid sensing elements 24' and 26' which are also adapted to turn on a energizing circuit 28 such as shown in FIG. 5.

In this invention, peak pulse power pulses are applied to each of the LEDs $20_1 \ldots 20_6$ so as to obtain maximum brightness, i.e. intensity, of the light output when energized without exceeding the operating specifications of the diodes which would otherwise result in catastrophic failure. This results in increased battery life and extended life of the light emitting diodes while maximizing the light output therefrom. This occurs as a result of energizing the LEDs with relatively short pulses of equal pulse width with maximum peak power which is equal to the rated forward voltage ($V_F$) and at the rated maximum current ($I_{MAX}$). The pulses are applied either in a sequential or random pattern at a frequency equal to n times the flashing time of one LED, where n equals the number of LEDs.

Figure 5:
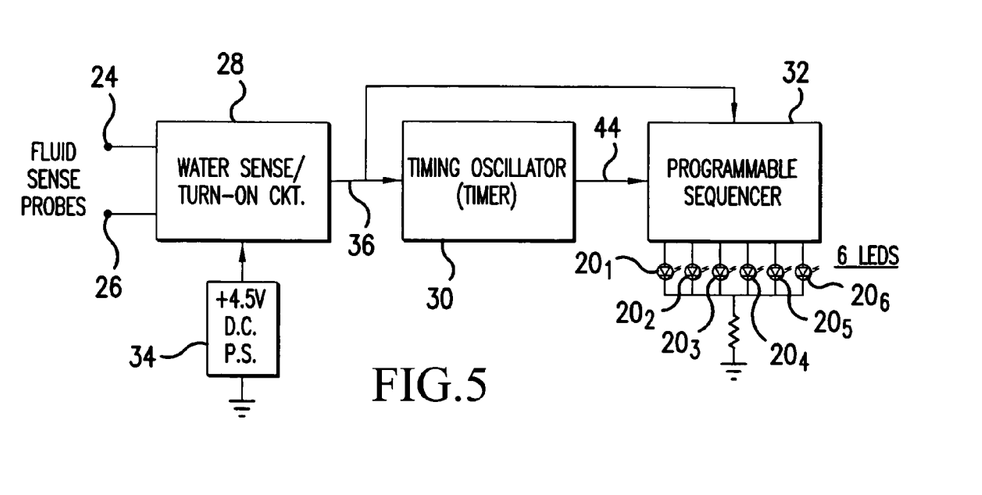
FIG. 5 is an electrical block diagram illustrative of apparatus for energizing the LEDs shown in FIGS. 1, 3 and 4.

Peak pulse power operation of the LEDs $20_1 \ldots 20_6$, in the embodiments illustrated in FIGS. 1, 3 and 4 is achieved by circuitry shown by the electrical block diagram of FIG. 5. Disclosed thereat is a water sense and turn-on circuit 28, an oscillator or timer 30 which generates a sequence of energizing pulses and a programmable sequencer 32, and a DC power supply 34. In FIG. 5, the DC power supply 34 is shown connected to the turn-on circuit 28; however, it should be noted that the power supply voltage from the DC power supply 34 is used to power all the circuit components shown in FIG. 5. Also shown in FIG. 5 are a pair of fluid sensor probes 24 and 26 which are used to enable the turn-on circuit 28 when the devices are submerged or float on a liquid such as water.

Figure 6:
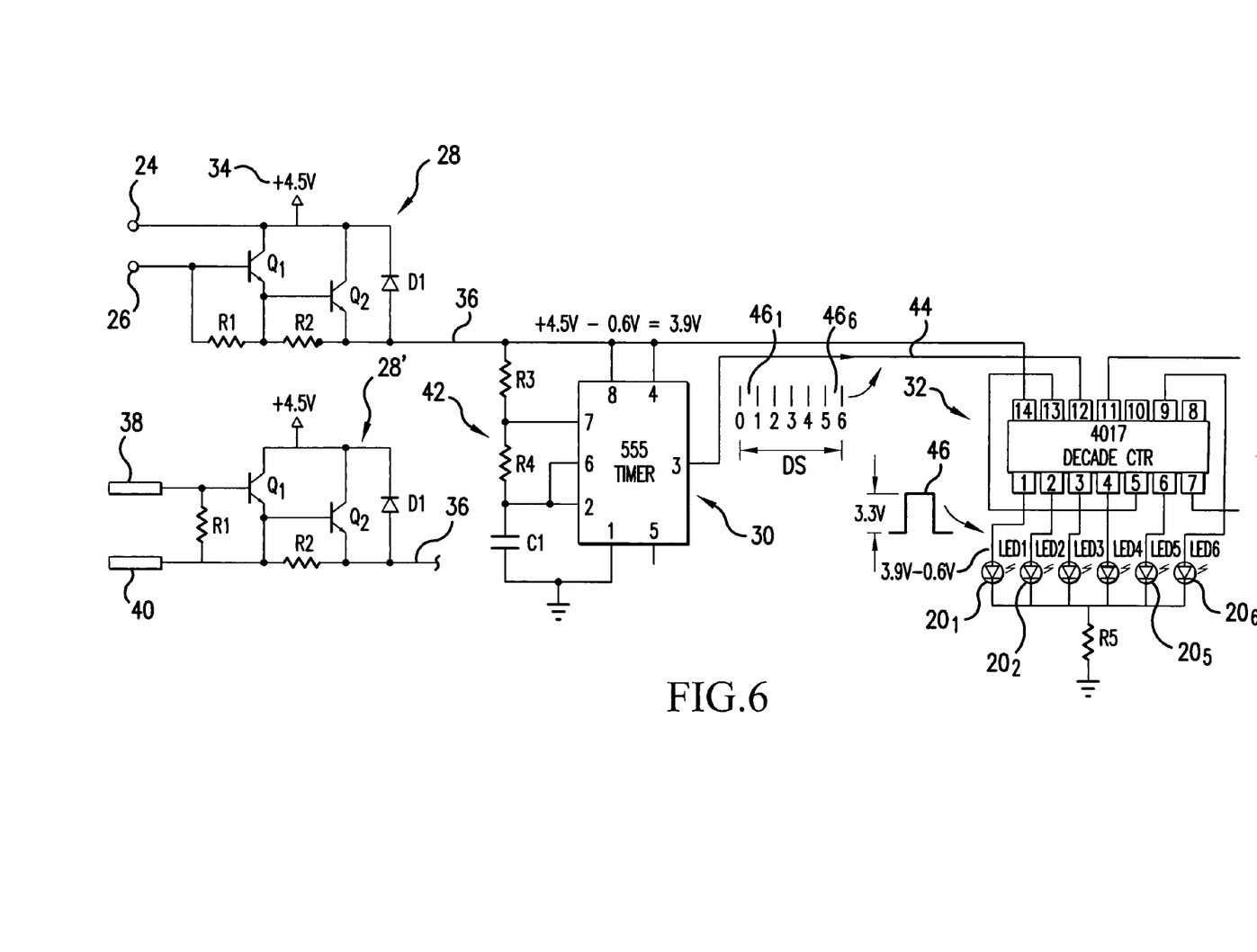
FIG. 6 is an electrical schematic diagram further illustrative of the block diagram shown in FIG. 5.

Referring now to FIG. 6, shown thereat is an electrical schematic diagram of the block diagram shown in FIG. 5. Two versions of the turn-on circuit are schematically shown in FIG. 6 by reference numerals 28 and 28'. Both circuits include a medium gain Darlington circuit comprised of a pair of NPN transistors Q1 and Q2 where the emitter of one transistor Q1, having base, emitter and collector electrodes, is directly connected to the base of the second transistor Q2.

In the turn-on circuit 28 as shown in FIG. 6, the two sensor probes 24 and 26 are respectively connected to the collector and base of transistor Q1. When out of water, the circuit remains open but when submerged in either fresh or salt water the Darlington transistors Q1 and Q2 become conductive. In FIG. 6, for example, when a +4.5 volt supply voltage is applied to the transistors Q1 and Q2, a voltage drop of or about 0.6 volts occurs across transistors Q1 and Q2, resulting in a supply voltage of or about +3.9 volts being applied to a DC supply bus 36.

The alternative embodiment of the turn-on circuit 28 in FIG. 6 utilizes a pair of dissimilar metal elements 38 and 40 respectively coupled to the base and emitter of transistor Q1. When the fish lure 10, for example, is submerged, or a liquid is applied across the elements 38 and 40, a voltage is generated across which is applied across the resistor R1 causing Q1 to turn on followed by a turn-on of transistor Q2 thereby switching the circuit to a conductive on-state and applying a +3.9 DC voltage to the bus 36 in the same manner as before.

It should be known that several other turn-on methods can be employed, such as a standard ON-OFF switch. Also it should be noted that an impact switch initiated by striking the fish lure 10 on a solid surface before placing it in the water can be used which, when struck again, turns off. Also, a pressure switch can be employed which turns ON and OFF as a function of water depth. A photoelectric switch, which senses the state of the water, can also be used.

The timing oscillator or timer 30 is comprised of a well known low-power CMOS timer known as the "555" time oscillator and is commercially available from many integrated circuit manufacturers such as Texas Instruments, Sanyo, and National Semiconductor.

Figure 7:
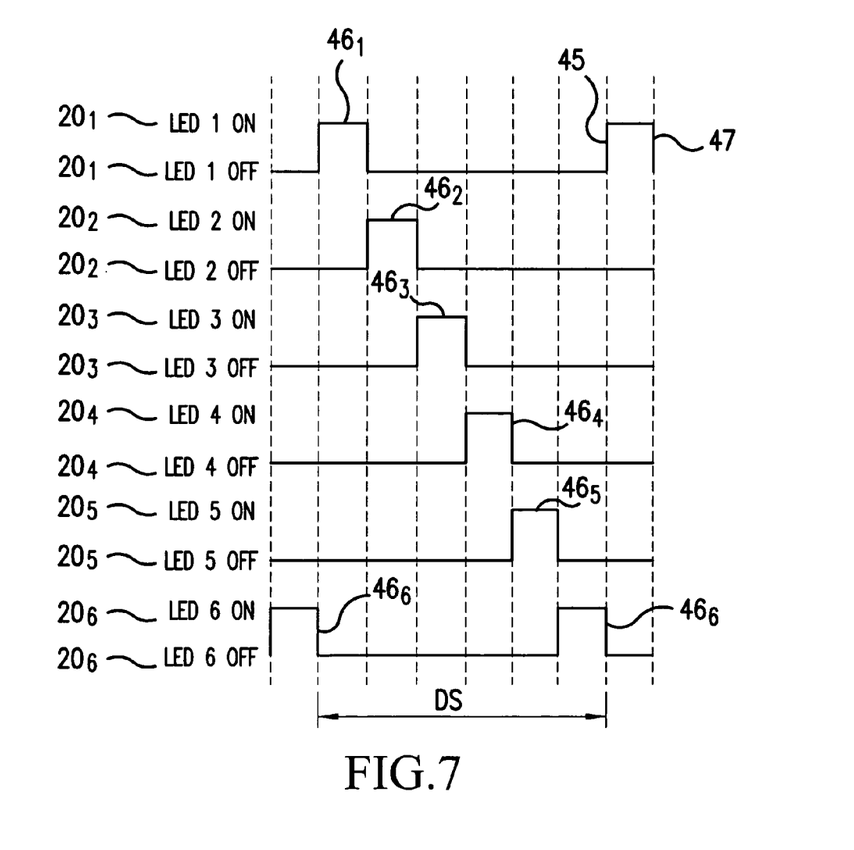
FIG. 7 is illustrative of a sequence of peak power pulses applied to each of the LEDs shown in FIGS. 5 and 6.

As shown in FIG. 6, the 555 timer 30 is marketed as an eight-pin circuit package where the +3.9 volt supply voltage is applied, for example, to pins 8 and 4. Pin 1 is grounded and pin 3 comprises the output signal pin. An astable or free-running oscillator which generates a pulse sequence such as shown in FIG. 7 is implemented by connecting an RC circuit consisting of fixed resistors R3, R4 and capacitor C1 to pins 2, 6 and 7 as shown. The frequency of operation is dependent upon the values of R3, R4 and C1.

The time intervals for the ON and OFF portions of the output pulses at pin 3 and as shown by the pulses $46_1 \ldots 46_6$ in FIG. 7 depend upon the values of R3 and R4 and thus operate to control the leading edge 45 and trailing edge 47 of each LED $20_1 \ldots 20_6$. The sequencer 32, then outputs the pulses which have a voltage amplitude supplying voltage substantially equal to the rated forward voltage ($V_F$) of each LED, causing them to sequentially start and stop emission instantly, and in so doing, generates a flash of light for the period of the applied pulse.

In the subject invention, the frequency of the timer 30 is configured to be n× the desired flashing time interval of one light emitting diode 20. Where six LEDs $20_1 \ldots 20_6$, for example, are employed, then the frequency of the timer 30 will be 6× the desired flashing time interval of one LED. Such a choice would allow for each LED to be ON for ⅙ of the entire duty cycle of the timing oscillator 30 such as ⅙ sec. for a 1 sec. timer duty cycle.

In the circuit shown in FIG. 6, pulses are outputted from pin 3 and applied to the programmable sequencer 32 which is shown comprising type 4017 decade counter manufactured, for example, by Phillips Semiconductors. As shown, the 4017 decade counter is wired to sequentially provide six output pulses $46_1 \ldots 46_6$ shown, for example, in FIG. 6 from pins 1, 2, 3, 4, 6, and 9. Pins 7 and 11 are shown being connected to ground. A connection is made from pins 5 to pin 13 and pin 14 is connected to the DC voltage bus 36. A common current limiting resistor R5 is also shown returning all six LEDs $20_1 \ldots 20_6$ to ground so that the current will not exceed the rated maximum current $I_{MAX}$, typically 20-25 milliamps (ma).

It can be seen that with approximately 0.6 voltage drop across a decade counter or sequencer 32 and limiting resistor R5, a pulse 46 of approximately 3.3 volts ($V_F$) is sequentially applied to the six LEDs $20_1, \ldots 20_6$. With the feedback circuit shown, the counter will output a pulse for each of the six LEDs in a sequential pattern as shown in FIG. 7. A random pattern can be implemented by a non-symmetrical placement of the six LEDs $20_1 \ldots 20_6$ such as shown with respect to the fish lure of FIG. 1.

Accordingly, the decade counter 32 will then output 6 LED energizing pulses $46_1, 46_2 \ldots 46_6$, as shown in FIG. 7 for sequentially energizing the six LEDs $20_1, \ldots 20_6$ and where each pulse has an amplitude substantially equal to the rated forward voltage ($V_F$) of approximately 3.3 volts as shown in FIG. 6, and having a rated maximum current ($I_{MAX}$) as limited by the resistor R5.

Figure 8:
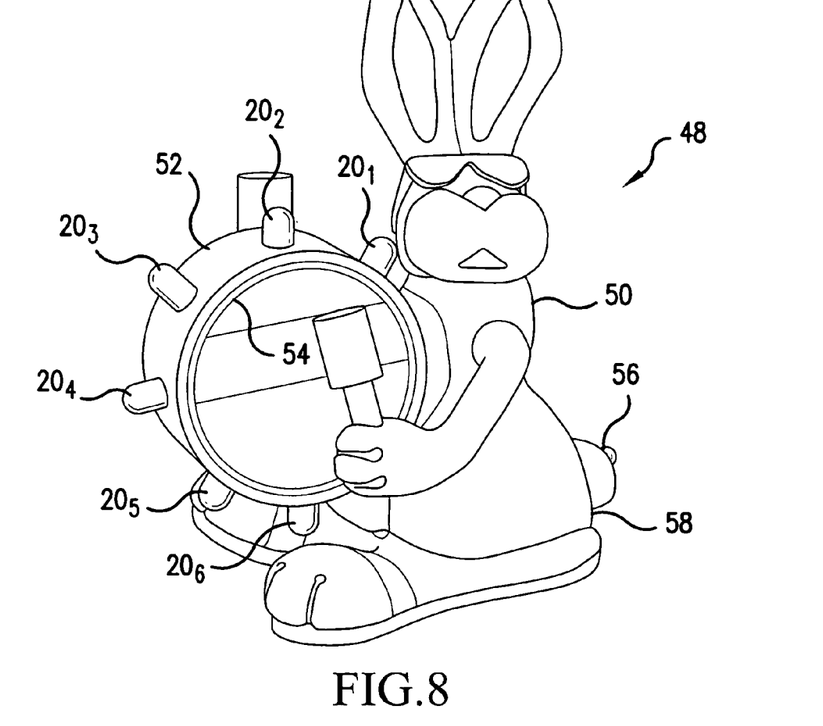
FIG. 8 is a perspective view of a fourth embodiment of the subject invention which comprises a novelty device in the form of a bunny holding a drum and including a set of LEDs on the outer rim thereof.

Referring now to FIG. 8, shown thereat is a third embodiment 48 of the subject invention which comprises a novelty device in the form of a bunny rabbit 50 holding a drum 52 and wherein six LEDs $20_1, 20_2 \ldots 20_6$ are externally mounted on the outer surface of the drum rim 54. A switch device which may be, for example, a push-button switch 56, is shown mounted on the rear lower half, i.e., tail portion of the bunny 50.

Figure 9:
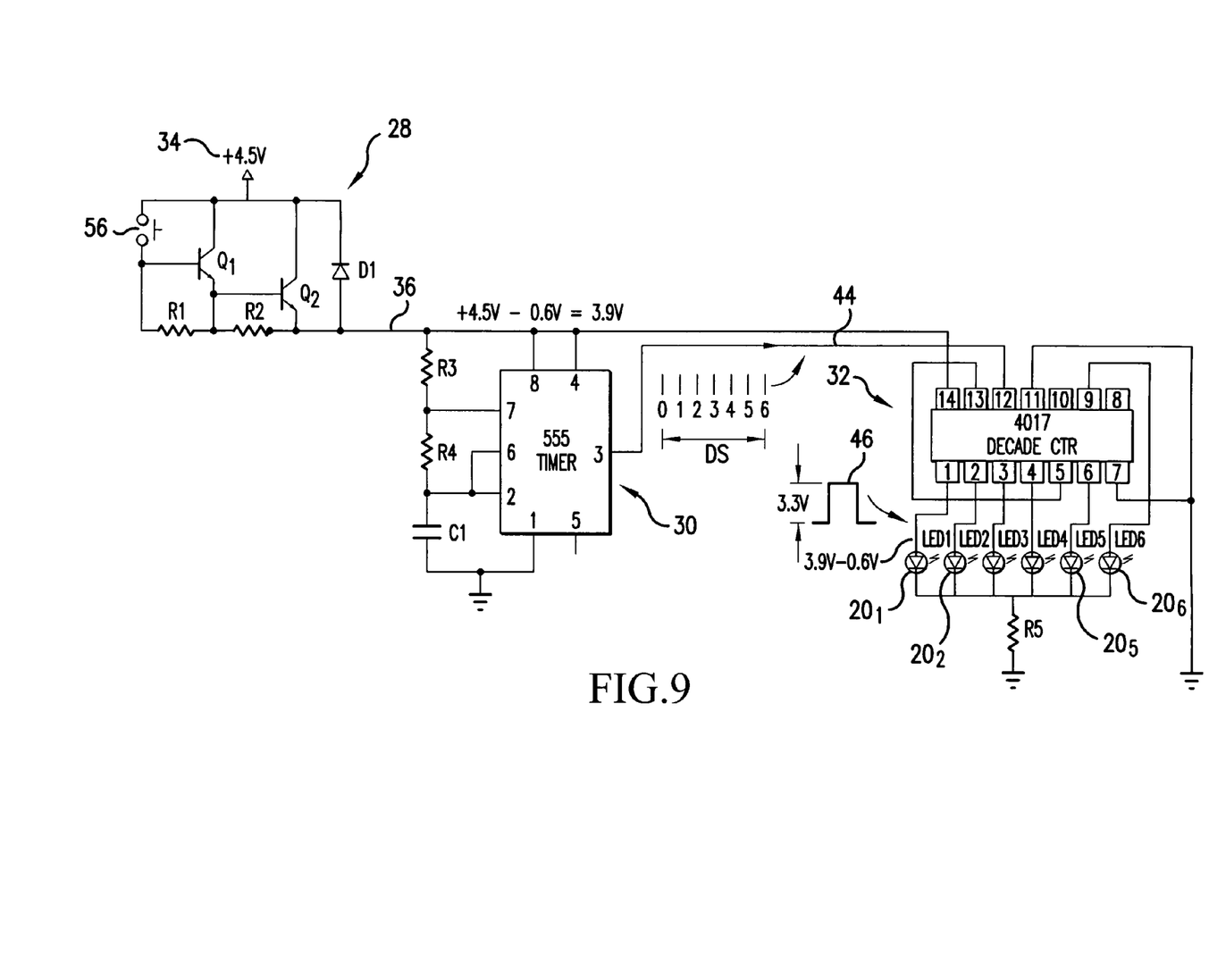
FIG. 9 is a schematic diagram for generating peak power pulses for energizing the LEDs shown in FIG. 8.

Circuitry for energizing the LEDs $20_1, \ldots 20_6$ in the embodiment 48 of FIG. 8 is shown in FIG. 9 and operates in all respects the same as that of FIG. 6 except that a manually operated switch 56 which was noted to be a push-button switch is inserted in the turn-on circuit 28 in place of the pair of contacts 24 and 26 shown in FIG. 5. As before, the switch 56 is also connected between the base and collector of Darlington circuit transistor Q1.

Figure 10A:
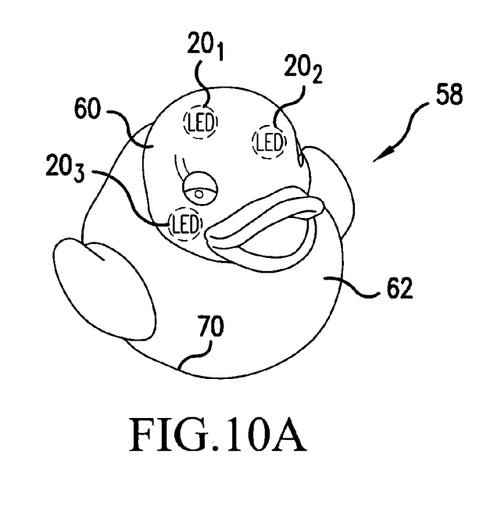
FIGS. 10A and 10B are illustrative of a fifth embodiment of the subject invention which comprises a variation of the duck-type bath toy shown in FIGS. 4A, 4B and 4C.
Figure 10B:
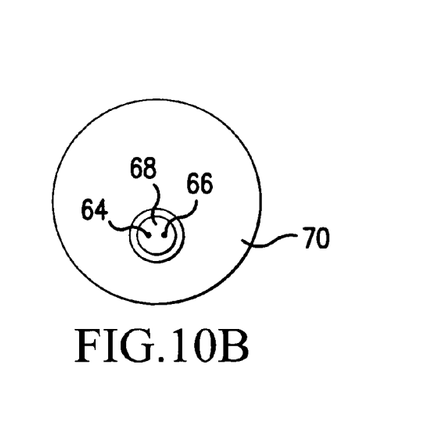
Figure 11:
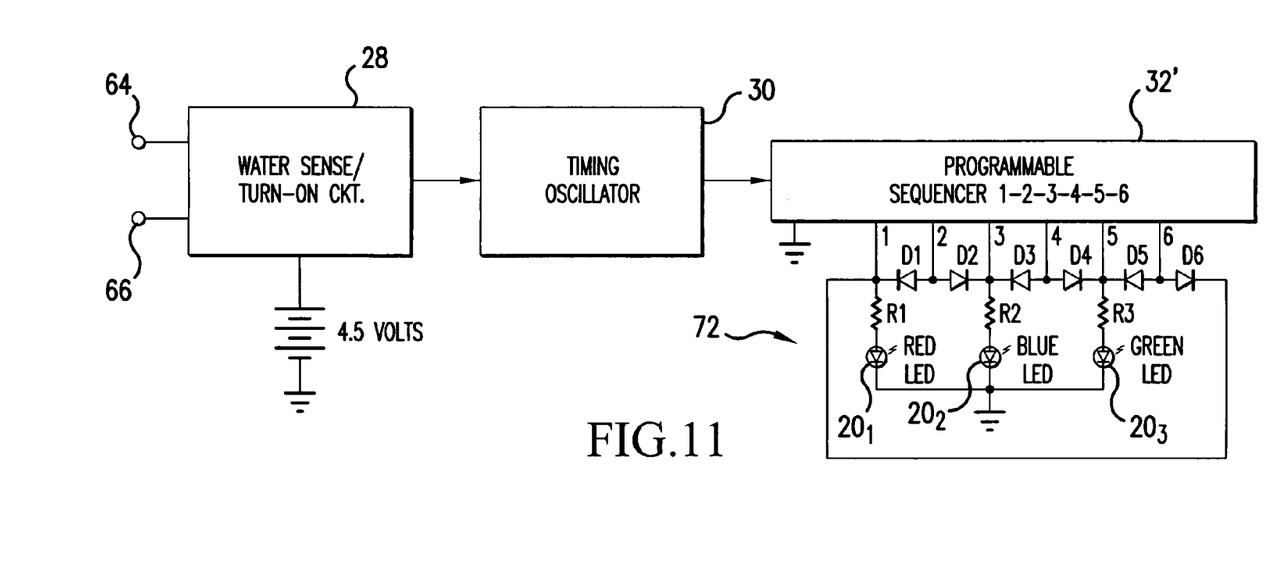
FIG. 11 is an electrical schematic diagram illustrative of apparatus for energizing a set of three LEDs mounted inside of the duck figure shown in FIG. 10A.

A fourth embodiment 58 of the subject invention is shown in FIGS. 10A and 10B and is directed to a novelty device 58 comprising an aquatic FIG. 62 in the form of small duck which is adapted to float on the surface of water, for example. In FIG. 10A, three light emitting diodes (LEDs), $20_1, 20_2$ and $20_3$ which, for example, respectively emit the colors red, blue and green, as shown in FIG. 11, are internally located in the head portion 60 of the duck 62. A pair of water sensing elements 64 and 66 are located on an internal access member 68 located on a bottom surface 70 of the body portion 62 as shown in FIG. 10B.

Referring now to FIG. 11, shown thereat is an electrical schematic circuit diagram including the circuitry 72 for energizing the three LEDs $20_1$, $20_2$ and $20_3$ so as to produce in addition to the colors red, blue and green, three additional colors, magenta, cyan and yellow. The circuitry 72 is connected to a programmable sequencer 32' which also comprises a 4017 type decade counter shown, for example, in FIGS. 6 and 9.

The circuit 72 shown in FIG. 11 includes a direct connection of resistor R1 from pin 1 to the LED $20_1$. In a like manner, resistor R2 is connected between pin 3 and LED $20_2$ and resistor R3 is connected from pin 5 to LED $20_3$. Pin 2 is connected to resistors R1 and R2 via a pair of diodes D1 and D2. Pin 4, in a like manner, is connected to resistors R2 and R3 via a pair of diodes D3 and D4 and pin 6 is connected to resistors R3 and R1 via a third pair of diodes D5 and D6.

Figure 12:
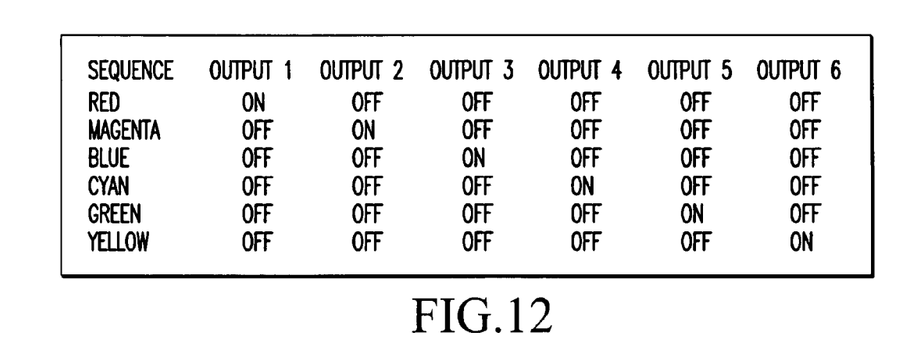
FIG. 12 is a diagram illustrative of the operational sequence of the three LEDs shown in FIG. 11.

In operation, when pulses $46_1 \ldots 46_6$ having an output sequence as shown, for example, in FIG. 12 are outputted from pins 1, 2, 3, 4, 5, and 6, the pulse $46_1$ from pin 1 energizes the red LED $20_1$, but now the pulse $46_2$ from pin 2 is simultaneously applied to both the red and blue LEDs $20_1$ and $20_2$ via the diodes D1 and D2 to produce the color of magenta. In a like manner, the pulse $46_3$ from the pin 3 will energize the blue LED $20_2$ and the pulse $46_4$ from pin 4 will be simultaneously connected LEDs $20_2$ and $20_3$ via the diodes D3 and D4 to produce the color cyan. The pulse $46_5$ from pin 5 energizes only the LED $20_3$ for the color green, and finally the pulse from pin 6 will be simultaneously applied to LED $20_3$ and LED $20_1$ to produce the color yellow. Thus, six different colors are sequentially produced from the six outputs of sequencer 32' with three LEDs $20_1$, $20_2$ and $20_3$ as indicated in FIG. 11.

Figure 13:
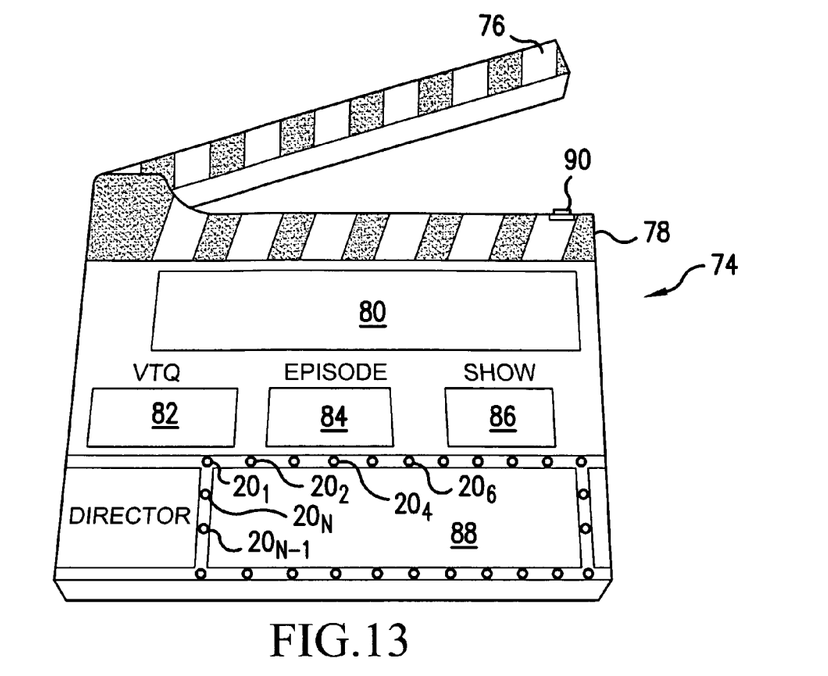
FIG. 13 is illustrative of a clapboard type of signaling device typically used in the film industry and which comprises a sixth embodiment of the subject invention.

Referring now to FIG. 13, shown thereat is a fifth embodiment 74 of the subject invention which is directed to a "clapboard" type of signaling device one might use, for example, in the film industry when filming a particular episode or film sequence. As shown in FIG. 13, in addition to conventional clapboard arms 76 and 78 along with one or more spaces 80, 82 ... 88 on which information is put, there is now included a plurality of LEDs $20_1, 20_2 \ldots 20_{n-1}, 20_n$ equally spaced around the outer edge of space 88.

Figure 14:
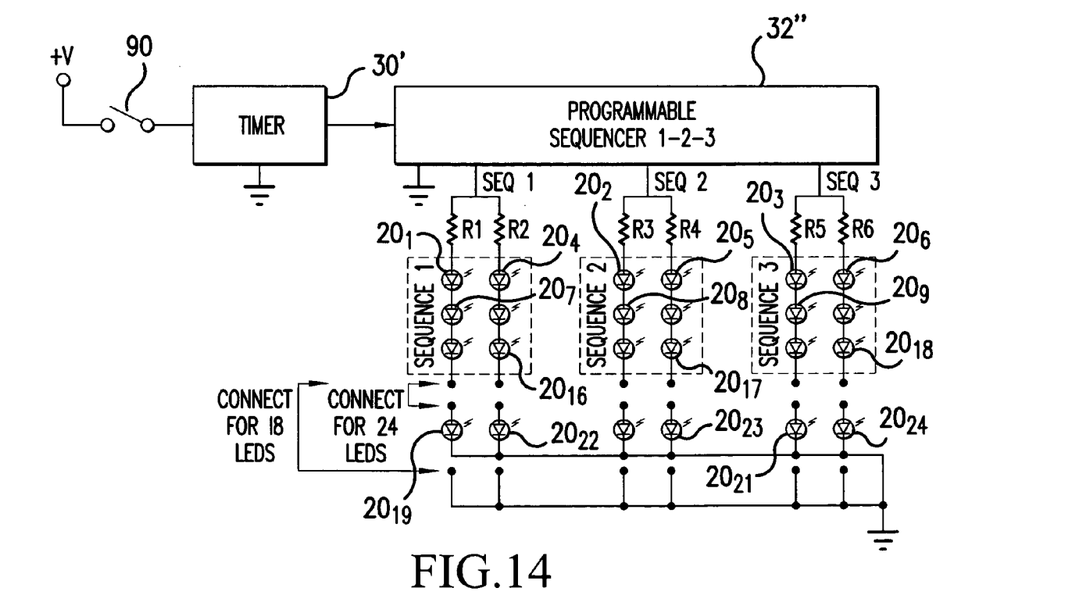
FIG. 14 is an electrical schematic diagram of circuitry for energizing an arrangement of LEDs such as shown in FIG. 13 for generating a light chase sequence of twenty four or eighteen LEDs.

FIG. 14 is illustrative of a circuit where either eighteen (18) LEDs $20_1 \ldots 20_{18}$ or twenty four (24) LEDs $20_1 \ldots 24_{24}$ can be energized in eight sets of four or five series connected LEDs, depending on which jumper connection is employed as shown, with two sets being energized simultaneously in each case to implement a "light chase" of flash sequence. Each of the four or five series connected LEDs are connected in series to respective current limiting resistors R1, R2, R3, R4, R5, and R6, with the LEDs connected to R1 and R2 being energized in sequence 1, the LEDs connected to R3 and R4 being energized in sequence 2 and the LEDs connected to R5 and R6 being energized in sequence 3.

Figure 15A:
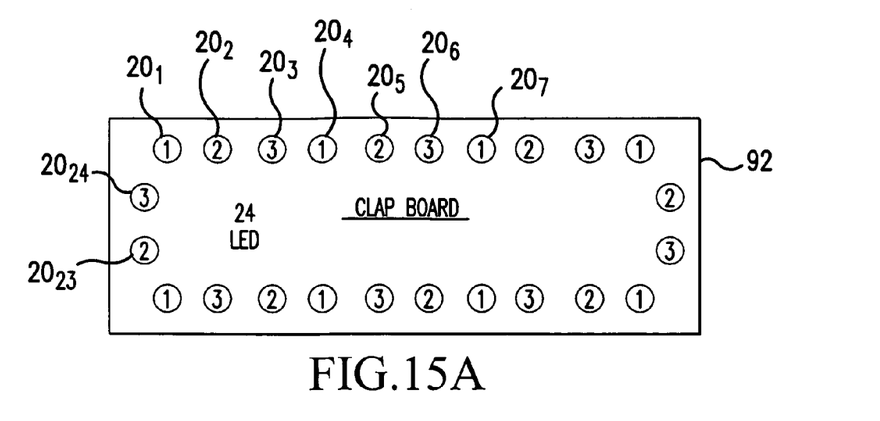
FIGS. 15A and 15B are illustrative of the arrangement of sets of twenty four and eighteen LEDs located on the clapboard shown in FIG. 13.
Figure 15B:
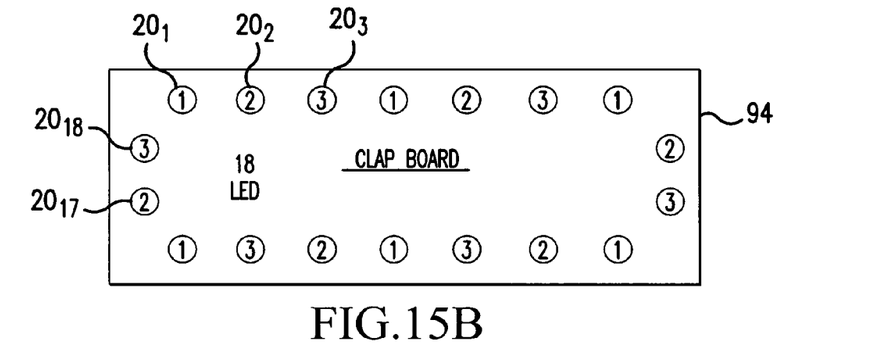
Figure 16:
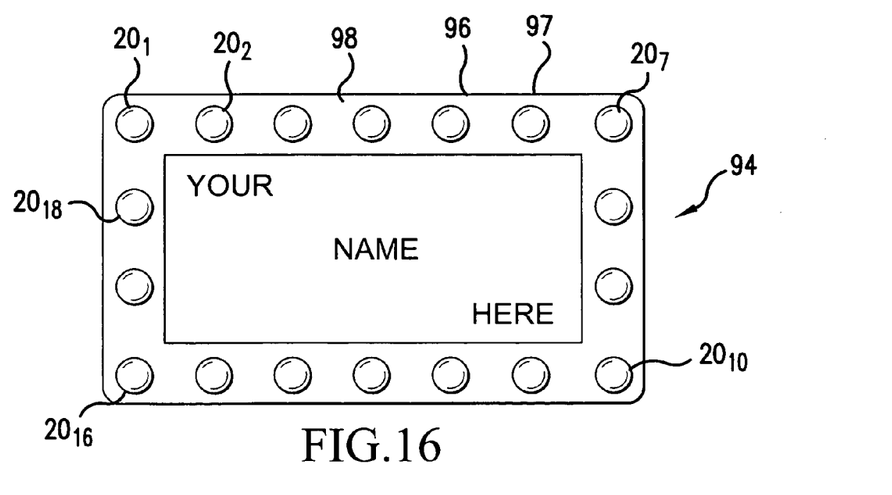
FIG. 16 is illustrative of a name tag type of device bordered by a set of 18 LEDs in accordance with a seventh embodiment of the subject invention.

In order to achieve a "chase" sequence, the timer 30' shown in FIG. 14 has a duty cycle of three output pulses. With an application of a power supply voltage +V (+12V or +15V) applied through a switch device 90, energizing pulses of approximately 3.3 volts ($V_F$) will be applied to each LED thereby providing a peak power pulse for each of the LEDs $20_1 \ldots 20_{24}$ which will be illuminated so as to provide a bright "light chase" display around the rectangular space 88 of the clapboard shown in FIG. 13. FIGS. 15A and 15B depict a twenty four LED $20_1 \ldots 20_{24}$ arrangement and an eighteen LED $20_1 \ldots 20_{18}$ clapboard arrangement, respectively.

Figure 17:
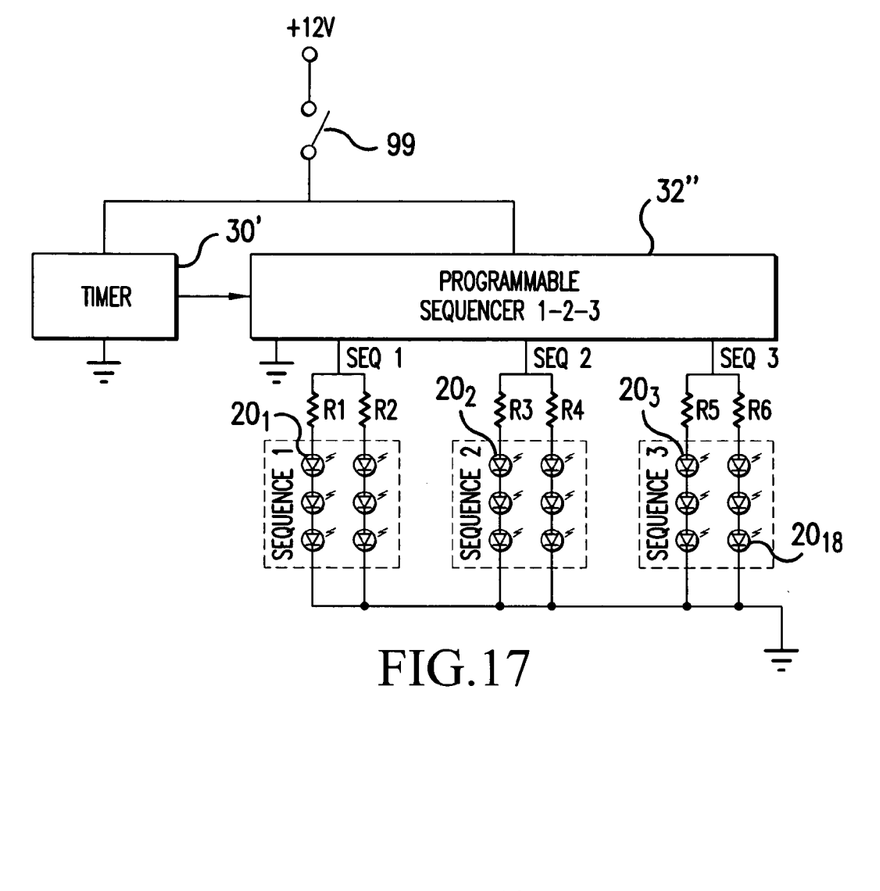
FIG. 17 is an electrical schematic diagram illustrative of circuitry for energizing the set of LEDs mounted on the name tag shown in FIG. 16; AND, FIG. 18 is illustrative of the arrangement of the eighteen LEDs located on the name tag shown in FIG. 16.
Figure 18:
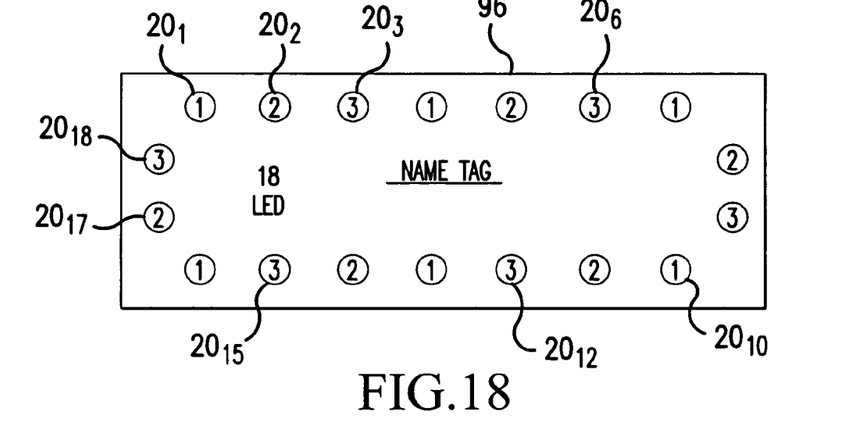

A sixth embodiment 94 of the subject invention is similar to the clapboard embodiment shown in FIG. 13, but now it is directed to a device in the form of name tag 96 having a configuration of, for example, eighteen LEDs $20_1 \ldots 20_{18}$ located on the outer perimeter portion 98 of the tag body 97. The LEDs $20_1 \ldots 20_{18}$ are connected as shown in the circuit diagram 17 which is similar to that of FIG. 14 in that a light chase sequence is generated by the LEDs being energized in eight sets of four series connected LEDs, with two sets being energized simultaneously. This effect is identical that achieved with the clapboard embodiment 74 shown in FIG. 13. As shown in FIG. 17, the name tag circuitry 94 includes a timer circuit 30' and a programmable sequencer 32" connected to the LEDs in the same fashion as an 18 LED embodiment would require, for example, as shown in FIG. 14. In the name tag circuitry, a +V (+12V) supply voltage is simultaneously connected to the timer 30' and the sequencer 32" via a manually actuated switch 99 which may be, for example, integrated with an attachment device, not shown, which is used to attach the name tag 97 to the wearer. With a +12V supply voltage which may be supplied by a battery, for example, each of the LEDs would be powered by a voltage which is substantially equal to the rated forward Voltage ($V_F$), along with the rated maximum current ($I_{max}$) provided by the resistors R1, R2 . . . R6, required for peak power operation.

Thus, what has been shown and described are several embodiments of light emitting diodes and their associated circuitry which operate the respective LEDs at peak pulse power, i.e., so as to maximize light output while protecting the diode from catastrophic failure.

Having thus shown and described what are presently considered to be the preferred embodiments of the invention, the foregoing detailed description merely illustrates principles of the invention. It will thus be appreciated that those skilled in the art will be able to devise various arrangements which, although not explicitly described or shown herein, embody the principles of the invention and are thus within its spirit and scope.

The invention claimed is:

1. A circuit for energizing a plurality of pulsed light emitting diodes (LEDs), comprising:
    a plurality of mutually displaced electrically pulsed light emitting diodes (LEDs) located in or on an article of manufacture so as to attract the attention of a viewer;
    a battery providing a DC power source for the light emitting diodes (LEDs); and,
    circuit means connected to the battery for only generating energizing pulses of substantially peak pulse power which are exclusively applied to said plurality of light emitting diodes (LEDs) for emitting relatively high intensity flashes of light for the duration of the respective energizing pulse of peak power, and wherein said peak pulse power of each of said energizing pulses comprises a voltage having an amplitude substantially equal to the rated forward voltage $V_F$ of the light emitting diodes (LEDs) and a current substantially equal to but not exceeding the maximum rated current $I_{MAX}$ thereof, resulting in increased life of the battery and extended life of the light emitting diodes (LEDs) while maximizing light output therefrom.

2. A circuit in accordance with claim 1 wherein the LEDs are energized so as to provide a flashing light pattern in a random or ordered sequence.

3. A circuit in accordance with claim 2 wherein the plurality of LEDs emit predetermined different colors of light including the colors red, green, blue, white, magenta, cyan, yellow, orange and ultra-violet.

4. A circuit in accordance with claim 1 wherein said circuit means include a timer circuit for generating timing pulse signals of a predetermined pulse width over a duty cycle equal to the number of said plurality of LEDs, and a circuit responsive to said timing signals for sequentially applying a peak power pulse for energizing one or more of said plurality of LEDs during the duty cycle.

5. A circuit in accordance with claim 4 wherein the timer circuit comprises a pulse generator circuit and wherein the circuit for generating the peak power pulse comprises a pulse counter circuit.

6. A circuit in accordance with claim 5 wherein the pulse counter circuit comprises a programmable pulse counter circuit.

7. A circuit in accordance with claim 6 wherein the timer circuit comprises an astable pulse generator and the pulse counter circuit comprises a programmable sequencer including a plurality of output terminals.

8. A circuit in accordance with claim 7 and additionally including current limiter means connected to the LEDs for limiting the respective current in the LED when energized to the rated maximum current $I_{MAX}$.

9. A circuit in accordance with claim 8 wherein said plurality of LEDs are connected to said output terminals of the programmable sequencer so as to be individually energized in a predetermined sequence.

10. The circuit in accordance with claim 9 wherein the plurality of light emitting diodes comprise six or more LEDs.

11. A circuit in accordance with claim 8 wherein said plurality of LEDs are connected to said output terminals so as to be sequentially energized individually and in alternate pairs for generating different colors of said predetermined different colors of light.

12. The circuit in accordance with claim 11 wherein the plurality of light emitting diodes comprise at least three LEDs.

13. A circuit in accordance with claim 8 wherein said plurality of LEDs are connected to said output terminals in plural sets of series connected LEDs and wherein multiple sets of at least two sets of said plurality of sets series connected LEDs are connected to a respective common terminal of said plurality of output terminals so as to be selectively energized for generating a light chasing pattern of flashing light pattern.

14. The circuit in accordance with claim 13 wherein each set of series connected diodes include at least three LEDs.

15. A circuit in accordance with claim 10 wherein the article of manufacture comprises a fish lure and wherein the LEDs are located on the fish lure.

16. A circuit in accordance with claim 15 wherein said circuit means includes a water activated circuit or device which becomes activated when the fish lure is submerged in either fresh or salt water.

17. A circuit in accordance with claim 10 wherein the article of manufacture comprises a device including a turn-on circuit which is enabled when the device is subjected to a liquid.

18. A circuit in accordance with claim 17 wherein the turn-on circuit includes a pair of dissimilar metal elements which generate a turn-on voltage when the device is subjected to a liquid.

19. A circuit in accordance with claim 17 wherein said turn-on circuit includes a first and second transistor connected as a Darlington circuit and wherein a base electrode and a collector or emitter electrode of the first transistor act as liquid sensing elements and wherein the Darlington circuit remains open circuited until subjected to a liquid, which then conduct so as to apply a voltage from the battery to the peak power pulse generating circuit.

20. A circuit in accordance with claim 10 wherein the article of manufacture comprises a toy or novelty type of device.

21. A circuit in accordance with claim 12 wherein the article of manufacture comprises a floatable toy or novelty type device.

22. A circuit in accordance with claim 21 wherein the DC power source comprises a DC battery and said electrical circuit means includes a turn-on circuit which is enabled when the device is subjected to a liquid.

23. A circuit in accordance with claim 22 wherein the turn-on circuit includes a pair of dissimilar metal elements which generate a turn-on voltage when the device is subjected to a liquid.

24. A circuit in accordance with claim 13 wherein the article of manufacture comprises a handheld device including a clapboard used for attracting attention and conveying information.

25. A circuit in accordance with claim 13 wherein the article of manufacture comprises an attention attracting identification device located on a person or thing.

26. A circuit in accordance with claim 20 wherein said electrical circuit means for connecting DC power includes a manually activated switch.

27. A fish lure or novelty device having a body in the form of a fish, comprising: a plurality of electrically energizable light emitting diodes located on an outside surface of said body; a DC power source located in said body; and a circuit also located in said body and being connected to and energized by said DC power source for generating a substantially peak power pulse applied to each of the light emitting diodes, said light emitting diodes emitting a flash of light in a random or ordered sequence.

28. A fish lure or novelty device in accordance with claim 27 wherein the peak power pulse comprises a pulse having an amplitude substantially equal to the rated forward voltage of the light emitting diode and a current limited to substantially the rated maximum current thereof.

29. A fish lure or novelty device in accordance with claim 27 wherein the DC power source comprises a DC pattern and a turn-on circuit which becomes activated when said body is located in water.

30. A method of powering one or more electrically pulsed light emitting devices comprising the steps of:
generating and applying peak power excitation pulses to said one or more light emitting devices, wherein said peak power pulses each comprises a voltage having an amplitude substantially equal to the rated forward voltage of the light emitting devices and a current substantially equal to the maximum rated current thereof.

31. The method of claim 30 wherein said one or more light emitting devices comprise a plurality of light emitting diodes.

* * * * *